(12) United States Patent
Knepper et al.

(10) Patent No.: US 11,595,637 B2
(45) Date of Patent: Feb. 28, 2023

(54) SYSTEMS AND METHODS FOR USING PERIPHERAL VISION IN VIRTUAL, AUGMENTED, AND MIXED REALITY (XR) APPLICATIONS

(71) Applicant: Dell Products, L.P., Round Rock, TX (US)

(72) Inventors: Larry Edward Knepper, Leander, TX (US); Yagiz Can Yildiz, Austin, TX (US); Christopher A. Torres, San Marcos, TX (US); Michael S. Gatson, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 643 days.

(21) Appl. No.: 15/978,365

(22) Filed: May 14, 2018

(65) Prior Publication Data
US 2019/0349575 A1    Nov. 14, 2019

(51) Int. Cl.
| *H04N 13/383* | (2018.01) |
| *H04N 13/344* | (2018.01) |
| *G06F 3/04815* | (2022.01) |
| *G06T 19/00* | (2011.01) |
| *H04N 13/371* | (2018.01) |

(52) U.S. Cl.
CPC ....... *H04N 13/383* (2018.05); *G06F 3/04815* (2013.01); *G06T 19/006* (2013.01); *H04N 13/344* (2018.05); *H04N 13/371* (2018.05)

(58) Field of Classification Search
CPC .. H04N 13/383; H04N 13/371; H04N 13/344; G06T 19/006; G06F 3/04815; G06F 1/163; G06F 1/1652; G06F 1/1686; G06F 1/1694; G06F 3/012; G06F 3/013; G06F 3/0482

See application file for complete search history.

(56) References Cited

U.S. PATENT DOCUMENTS

| 2004/0227703 | A1* | 11/2004 | Lamvik | G02B 27/0172 345/76 |
| 2009/0243970 | A1* | 10/2009 | Kato | G02B 27/0176 345/8 |
| 2012/0274653 | A1* | 11/2012 | Tang | G02B 27/0172 345/593 |
| 2014/0146394 | A1* | 5/2014 | Tout | G09B 9/307 359/630 |
| 2015/0094142 | A1* | 4/2015 | Stafford | G06F 3/04815 463/31 |
| 2016/0131912 | A1* | 5/2016 | Border | G02B 27/0176 345/8 |
| 2016/0217623 | A1* | 7/2016 | Singh | G09G 3/003 |

(Continued)

*Primary Examiner* — Tat C Chio
(74) *Attorney, Agent, or Firm* — Fogarty LLP

(57) ABSTRACT

Systems and methods for using peripheral vision in virtual, augmented, and mixed reality (collectively referred to as "xR") applications are described. In some embodiments, an Information Handling System (IHS) may include a processor and a memory coupled to the processor, the memory having program instructions stored thereon that, upon execution, cause the IHS to: render an object in a peripheral field-of-view of a user; detect at least one of: the user's eye movement, or the user's head rotation; and determine whether to re-render the object based upon the detection.

9 Claims, 14 Drawing Sheets

(56) References Cited

U.S. PATENT DOCUMENTS

| | | | |
|---|---|---|---|
| 2016/0252956 A1* | 9/2016 | Wheeler | G02B 27/017 |
| | | | 345/156 |
| 2017/0038588 A1* | 2/2017 | Passmore | G06T 15/50 |
| 2017/0115489 A1* | 4/2017 | Hu | G02B 27/0172 |
| 2017/0123492 A1* | 5/2017 | Marggraff | G06F 3/0236 |
| 2017/0199565 A1* | 7/2017 | Dong | G06F 3/012 |
| 2017/0228938 A1* | 8/2017 | Fateh | G06F 3/147 |
| 2017/0285344 A1* | 10/2017 | Benko | G02B 27/0172 |
| 2017/0322911 A1* | 11/2017 | Kim | H04N 13/344 |
| 2018/0095636 A1* | 4/2018 | Valdivia | G06F 3/04815 |
| 2018/0136471 A1* | 5/2018 | Miller | G02B 27/017 |
| 2018/0261003 A1* | 9/2018 | Peli | G09B 9/307 |
| | | | 359/630 |
| 2018/0278993 A1* | 9/2018 | Crisler | H04N 21/44218 |

\* cited by examiner

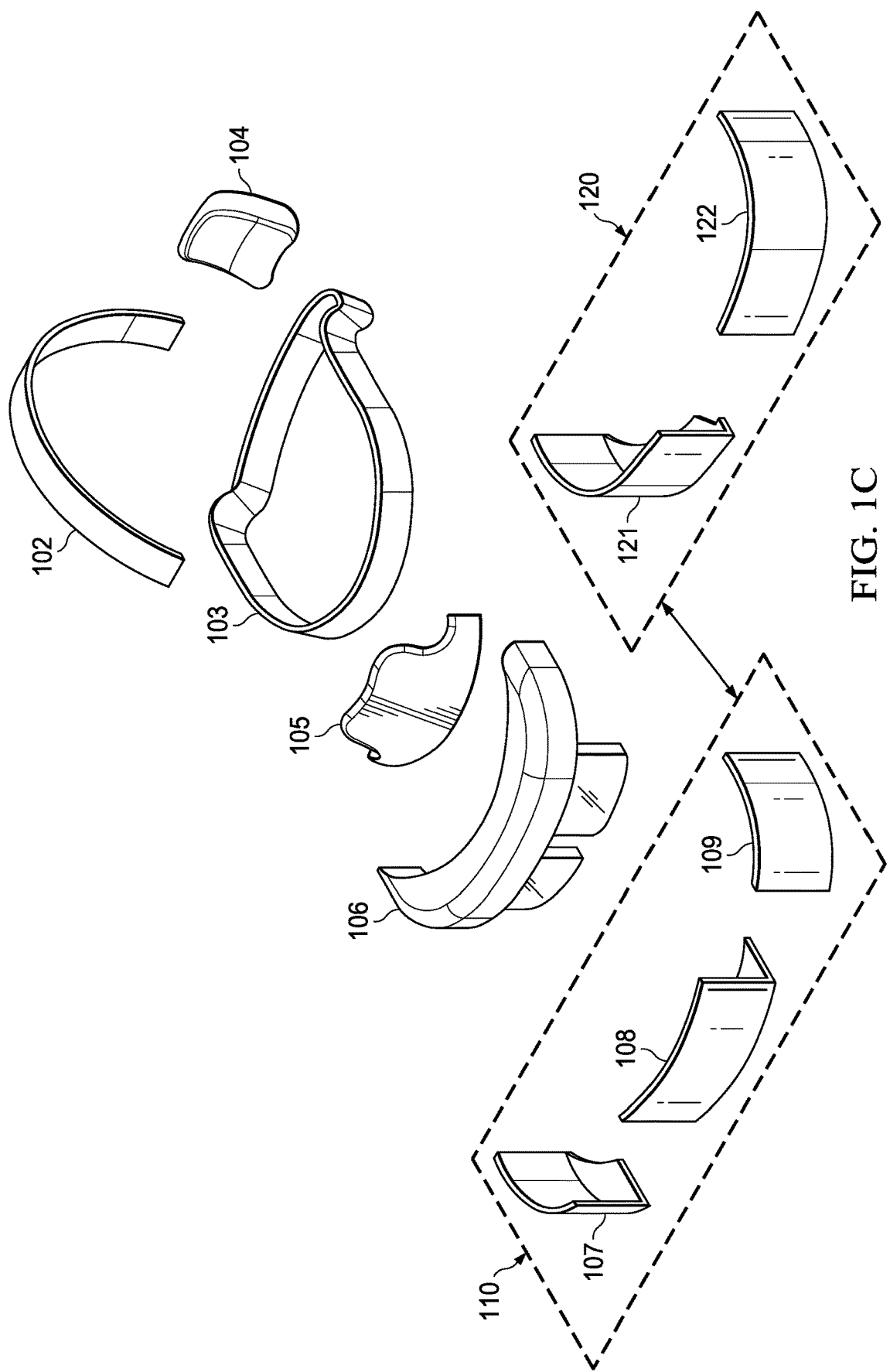

SYSTEMS AND METHODS FOR USING PERIPHERAL VISION IN VIRTUAL, AUGMENTED, AND MIXED REALITY (XR) APPLICATIONS

FIELD

The present disclosure generally relates to information handling systems (IHSs), and, more particularly, to systems and methods for using peripheral vision in virtual, augmented, and mixed reality ("xR") applications.

BACKGROUND

The goal of virtual reality (VR) is to immerse users in virtual environments. A conventional VR device obscures a user's real-world surroundings, such that only digitally-generated images remain visible.

In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "headsets").

In modern implementations, headsets may be tethered to an external or host computer. Most headsets do not have as much processing capability than the host computer, so the host computer is used to generate the digital images to be displayed by the headset. The headset transmits information to the host computer regarding the state of the user (e.g., position, proximity to other users, etc.), which in turn enables the host computer to determine which image or frame to show to the user next, and from which perspective, as the user moves in space.

Current headset solutions have a horizontal field-of-view (FOV) ranging from about 45 degrees to 130 degrees, and therefore are limited to stereo vision applications. The inventors hereof have recognized, however, that there is a need for headsets that can extend the usable display area to include the user's peripheral vision, where Graphical User Interface (GUI) objects such as alerts, menus, etc. may be rendered and/or manipulated.

SUMMARY

Embodiments of systems and methods for using peripheral vision in virtual, augmented, and mixed reality ("xR") applications are described. In an illustrative, non-limiting embodiment, an Information Handling System (IHS) may include: a processor; and a memory coupled to the processor, the memory having program instructions stored thereon that, upon execution, cause the IHS to: render an object in a peripheral field-of-view of a user; detect at least one of: the user's eye movement, or the user's head rotation; and determine whether to re-render the object based upon the detection.

In some embodiments, the IHS may be coupled to a headset, and the headset may include a main portion, a left peripheral portion, and a right peripheral portion. The main portion may include a Digital Light Processing (DLP) device, and each of the left and right peripheral portions may include a curved organic light-emitting diode (OLED) device. Moreover, the object may be part of a Graphical User Interface (GUI) presented to the user during execution of an xR application.

In some cases, in response to detection of eye movement from a forward position to a peripheral position, the program instructions, upon execution, may cause the IHS to re-render the object shifted in the direction of the eye movement. Additionally, or alternatively, in response to a speed of the head rotation being under a threshold value, the program instructions, upon execution, may cause the IHS to maintain the rendering of the object. Additionally, or alternatively, in response to a speed of the head rotation being above a threshold value, the program instructions, upon execution, may cause the IHS to re-render the object shifted in a direction opposite the head rotation. Additionally, or alternatively, in response to a speed of the head rotation being above a threshold value, the program instructions, upon execution, may cause the IHS to stop rendering the object during at least a portion of the head rotation.

The program instructions, upon execution, may also cause the IHS to identify the peripheral field-of-view, for the user, prior the rendering the object. For example, to identify the peripheral field-of-view, the program instructions, upon execution, may cause the IHS to: render an initial object; enable the user to displace the initial object in a given direction until the object at least partially disappears from the user's peripheral field-of-view; and record an extent of the peripheral field-of-view in the given direction based upon the displacement.

In another illustrative, non-limiting embodiment, a method may include rendering an object in a first peripheral region of a display, wherein the display is part of a user's headset; monitoring the user's eye movement and head rotation; and re-rendering the object in a second peripheral region of the display in response to the monitoring.

For example, the second peripheral region may be to the right of the first peripheral region, and the re-rendering may be in response to the eye movement being in a right direction. Additionally, or alternatively, the second peripheral region may be to the left of the first peripheral region, and the re-rendering may be in response to the eye movement being in a left direction. Additionally, or alternatively, the second peripheral region may be on a same side of the display as a direction of the head rotation, and the re-rendering may be in response to the head rotation having a speed below a threshold value. Additionally, or alternatively, the second peripheral region may be on an opposite side of the display as a direction of the head rotation, and the re-rendering may be in response to the head rotation having a speed above a threshold value. Moreover, in some cases the method may include waiting to re-render the object until completion of a head rotation.

In yet another illustrative, non-limiting embodiment, a hardware memory device may have program instructions stored thereon that, upon execution by a hardware processor, cause the hardware processor to: render an object in a peripheral display portion of a headset; detect the user's head rotation; and determine, in response to the detection, whether to re-render the object. The program instructions may cause the hardware processor to re-render the object on a different area of the first peripheral display portion, at least in part, in response to the head rotation having a speed below a threshold value.

Additionally, or alternatively, the program instructions may cause the hardware processor to re-render the object on a same area of the first peripheral display portion, at least in part, in response to the head rotation having a speed below a threshold value. Additionally, or alternatively, the program instructions may cause the hardware processor to re-render the object on a second peripheral display portion opposite the first peripheral display portion, at least in part, in response to the head rotation having a speed above a threshold value.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIGS. 1A-D are perspective views of examples of a headset having a peripheral vision display system, according to some embodiments.

DETAILED DESCRIPTION

Embodiments described herein provide systems and methods for using peripheral vision in virtual, augmented, and mixed reality (collectively referred to as "xR") applications. These techniques are particularly useful in xR applications that employ head-mounted devices (HMDs), Heads-Up Displays (HUDs), and eyeglasses (collectively referred to as "headsets").

Figure 1A:
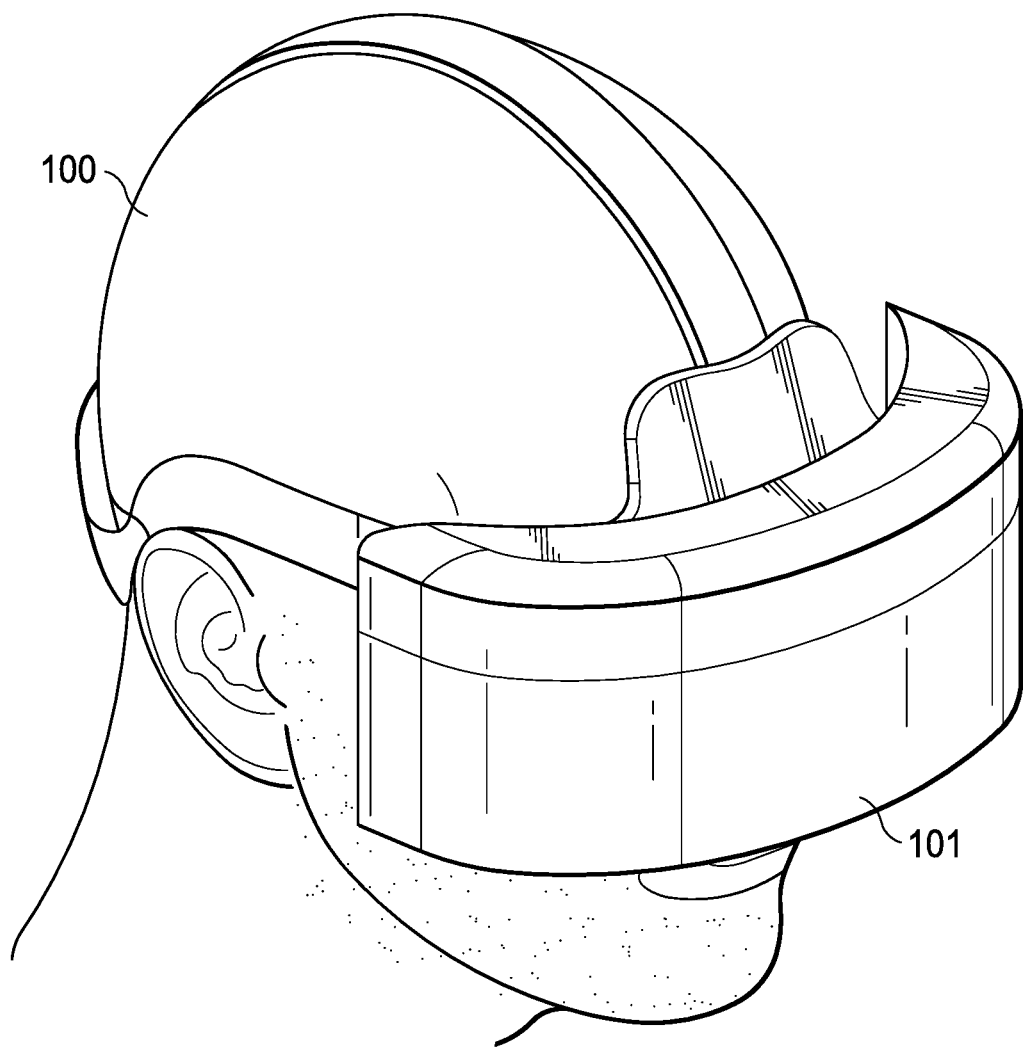
Figure 1B:
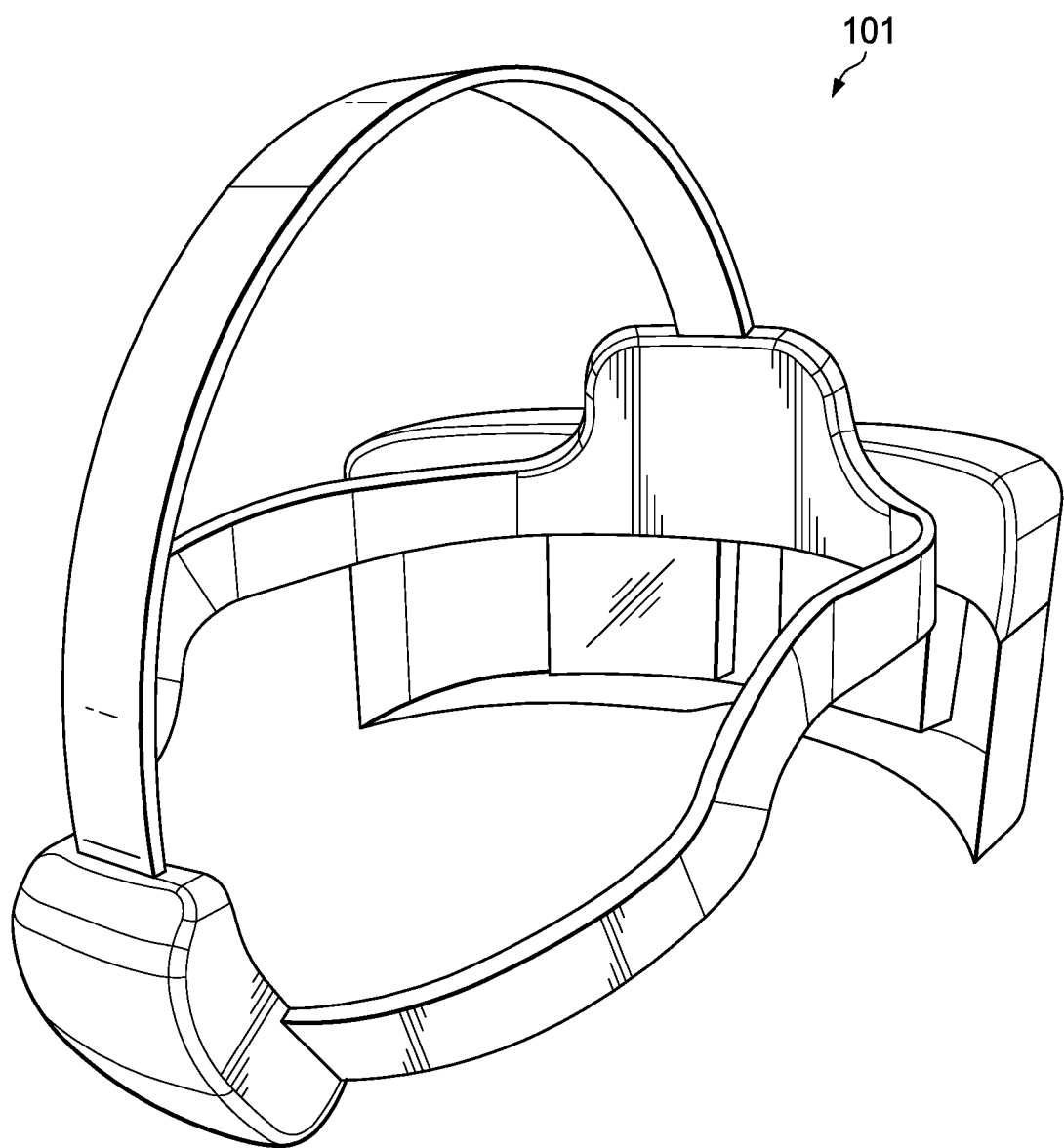

FIG. 1A shows an example of a headset 101 with a peripheral vision display system. Here, headset 101 is being worn by user 100 around their heads and over their eyes, during execution of an xR application. FIG. 1B shows a back-to-front perspective of headset 101 without the user 100's head. FIG. 1C provides an exploded view of headset 101's external components, including: crown strap with input/output (I/O) cable or wiring 102, rear housing 103, crown strap 104, forehead pad 105, and main housing 106 (including an optics assembly, a main printed circuit board (PCB) assembly, etc.).

Figure 1D:
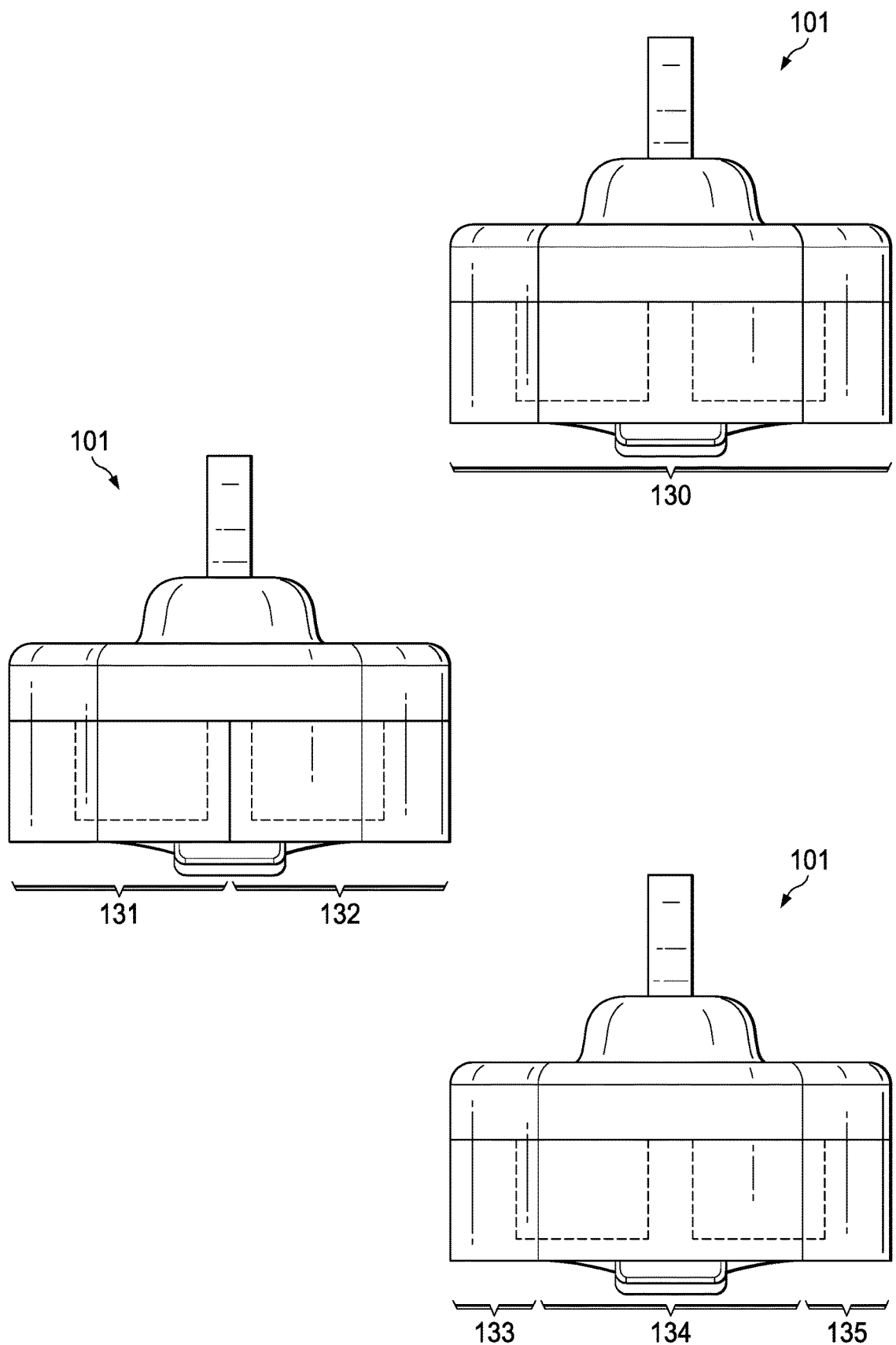

In the case of a 3-piece design, display system 110 may include optically clear window 108 between right peripheral curved display 107 and left peripheral curved display 109. In a 2-piece design, display system 120 may include right peripheral curved display 121 and left peripheral curved display 122. FIG. 1D shows headset 101 in different configurations, including single-piece display 130, two-piece display 131-132, and three-piece display 133-135.

Figure 2:
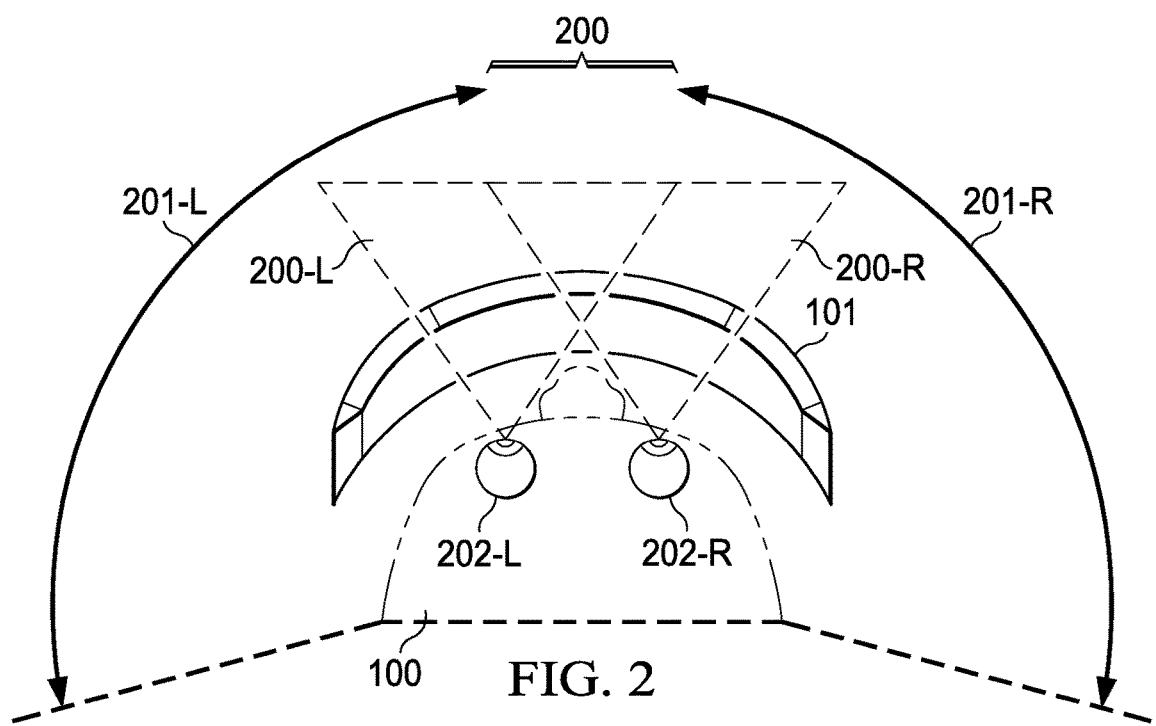
FIG. 2 is a top view of an example of the headset, according to some embodiments.

FIG. 2 is a top view of an example of headset 101, according to some embodiments. When headset 101 is being worn, user 100 has left eye 202-L and right eye 202-R positioned immediately behind the display system. In this position, user 100 possesses stereoscopic vision 200, left peripheral vision 200-L, and right peripheral vision 200-R. Left eye 202-L has a field-of-view (FOV) that covers stereoscopic vision 200 and left peripheral vision 200-L, and right eye 202-R has an FOV that covers stereoscopic vision 200 and right peripheral vision 200-R.

In various embodiments, the display system of headset 101 includes additional peripheral display areas that cover the user's left peripheral vision 200-L (into left peripheral region 201-L) and right peripheral vision 200-R (into right peripheral region 201-R). Accordingly, headset 101 may be used to render xR entities and/or objects to user 100, such as: images, graphics, icons, buttons, menus, controls, characters, hyperlinks, text, or any other suitable Graphical User Interface (GUI) component. Headset 101 may render these objects in a peripheral visual space using the peripheral vision display system.

Moreover, as user 100 operates headset 101, events may take place in left peripheral region 201-L or right peripheral region 201-R that require or draw the user 100's attention, thus causing eye movement and/or head rotation in either direction. And, in many of situations, obfuscating the user's peripheral vision of the real-world with xR entities can be counterproductive or dangerous. To address these, and other problems, techniques described herein also enable the intelligent handling and rendering of objects on peripheral displays.

Figure 3:
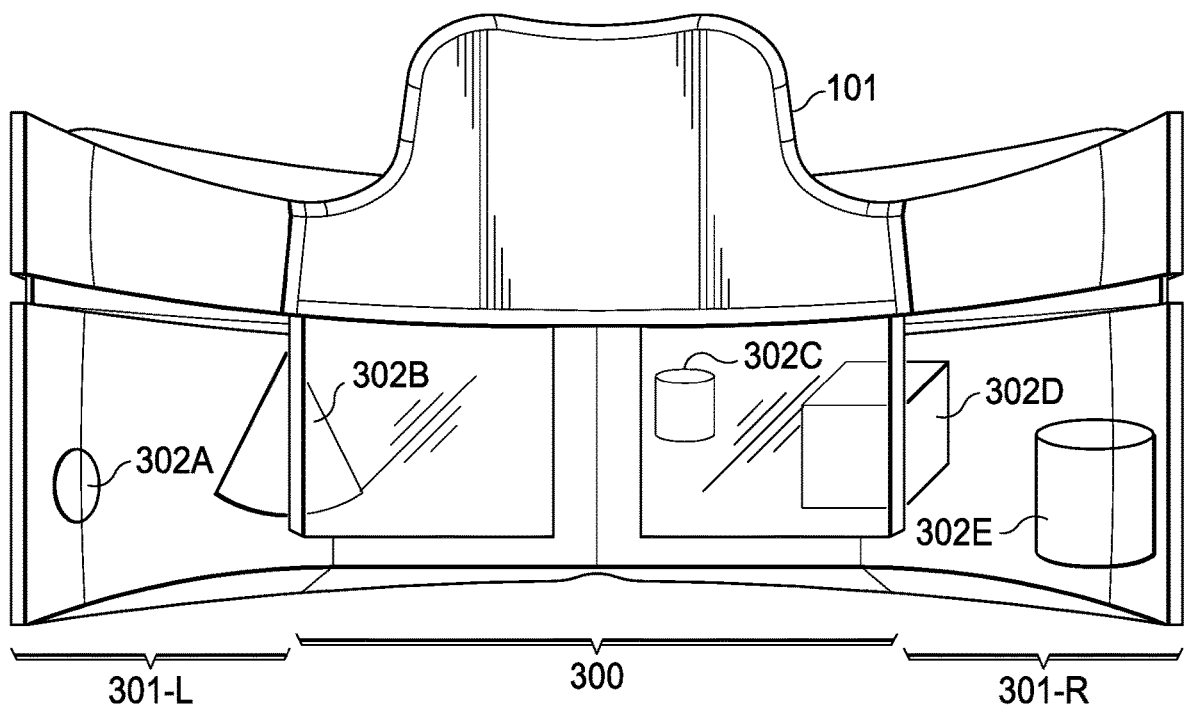
FIG. 3 illustrates an example of a peripheral vision display system, according to some embodiments.

FIG. 3 illustrates user 100 as they see their physical environment via the display system mounted on headset 101's frame or body. Generally, such a display system shows information in the form of xR entities and/or objects overlaying a visible physical environment where real-world entities 302A-E reside.

In this implementation, the frame or body of headset 101 includes two main Digital Light Processing (DLP) displays 300 (left and right) positioned to cover the user's stereoscopic vision 200. Left and right peripheral displays 301-L and 301-R may be curved organic light-emitting diode (OLED) displays with flexible sheets of organic electroluminescent material, positioned to cover user 100's left and right peripheral vision 200-L and 200-R, respectively.

Figure 4:
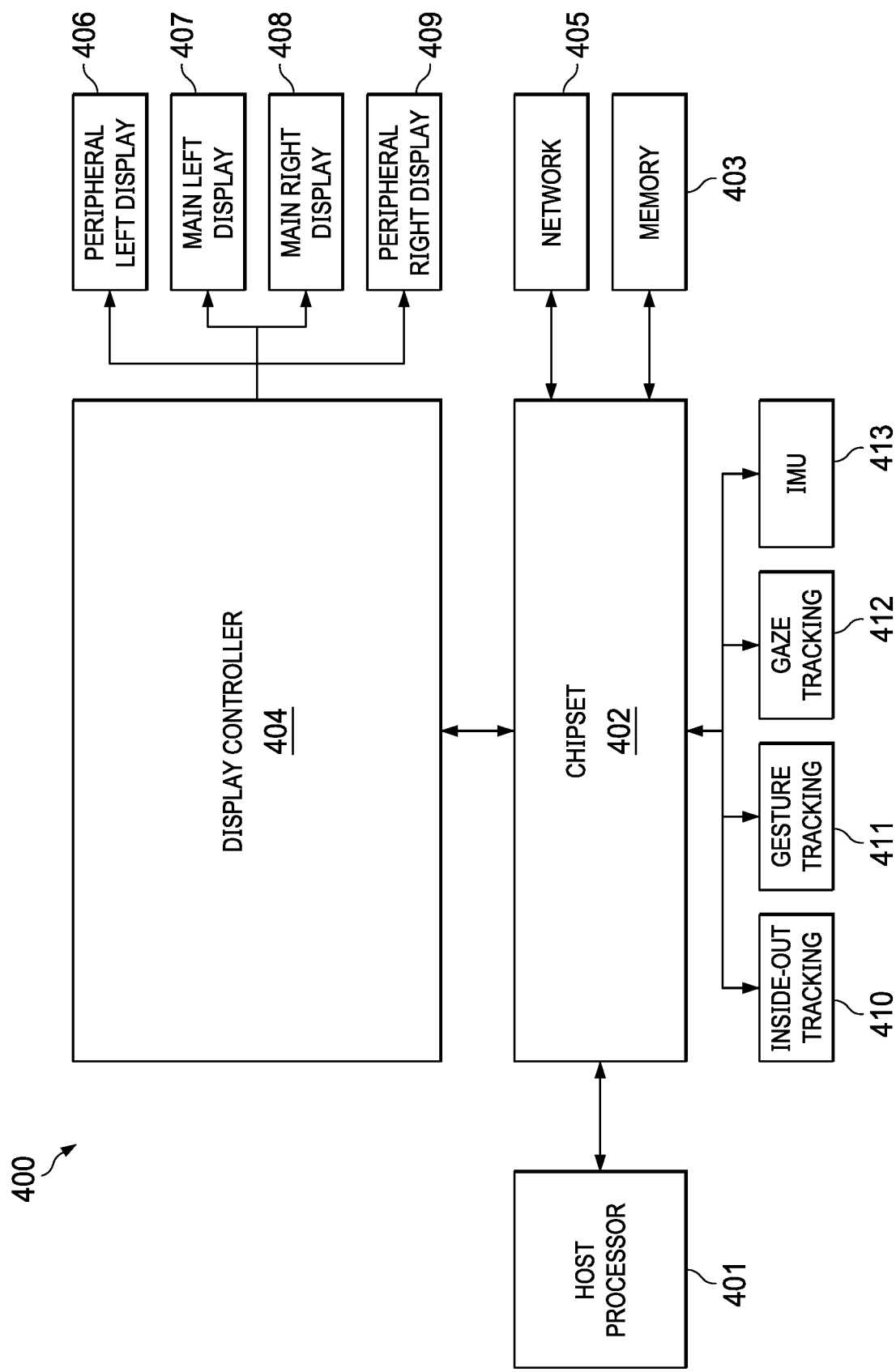
FIG. 4 is a block diagram of examples of components of an Information Handling System (IHS), according to some embodiments.

FIG. 4 is a block diagram of non-limiting examples of Information Handling System (IHS) components according to some embodiments. In some cases, IHS 400 may be used as an external device in wired or wireless communication with headset 101. Additionally, or alternatively, headset 101 may include component(s) of IHS 400.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

As shown, IHS 400 includes processor 401. In various embodiments, IHS 400 may be a single-processor system, or a multi-processor system including two or more processors. Processor 401 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 400 includes chipset 402 coupled to processor 401. In certain embodiments, chipset 402 may utilize a QuickPath Interconnect (QPI) bus to communicate with processor 401. In various embodiments, chipset 402 provides processor 401 with access to a number of resources. For example, chipset 402 may be coupled to network interface 405 to enable communications via various wired and/or wireless networks.

Chipset 402 may also be coupled to display controller or graphics processor 404 via a graphics bus, such as an Accelerated Graphics Port (AGP) or Peripheral Component Interconnect Express (PCIe) bus. As shown, graphics processor 404 provides video or display signals to: left peripheral display or panel 406 (e.g., 301-L), main left display or panel 407, main right display or panel 408, and right peripheral display or panel 409 (e.g., 301-R).

Chipset 402 further provides processor 101 and/or display controller 404 with access to memory 403. In various embodiments, memory 403 may be implemented using any suitable memory technology, such as static RAM (SRAM), dynamic RAM (DRAM) or magnetic disks, or any nonvolatile/Flash-type memory, such as a solid-state drive (SSD) or the like.

Memory 403 may store program instructions that, upon execution by processor 401 and/or display controller 404, present an xR application to user 100 wearing headset 101. In various embodiments, program instructions stored in memory 403 may also configure processor 401 and/or display controller 404 to enable the intelligent handling and rendering of objects on peripheral displays 406 and 409.

Other headset resources coupled to processor 401 through chipset 402 may include, but are not limited to: inside-out tracking system 410, gesture tracking system 411, gaze tracking system 412, and inertial measurement unit (IMU) system 413.

Inside-out tracking system 410 may include one or more optical sensors (e.g., a camera) configured to determine how headset 101 moves in relation to its environment. For example, inside-out tracking system 410 may be configured to implement markerless tracking techniques that use distinctive visual characteristics of the physical environment to identify specific images or shapes which are then usable to calculate headset 101's position and orientation. In some cases, inside-out tracking system 410 may also include an accelerometer and/or gyroscope to increase precision.

Gesture tracking system 411 may include one or more cameras or optical sensors that enable user 100 to use their actual hands for interaction with objects rendered by headset 101. For example, gesture tracking system 411 may be configured to implement hand tracking and gesture recognition in a 3D-space via a 2D camera. In some cases, gesture tracking system 411 may track a selectable number of degrees of freedom (DOF) of motion, with depth information, to recognize dynamic hand gestures (e.g., swipes, clicking, tapping, grab and release, etc.) usable to control or otherwise interact with xR applications executed by headset 101.

Gaze tracking system 412 may include an inward-facing projector configured to create a pattern of infrared or (near-infrared) light on the user's eyes, and an inward-facing camera configured to take high-frame-rate images of the eyes and their reflection patterns; which are then used to calculate the user's eye's position and gaze point. In some cases, gaze detection or tracking system 412 may be configured to identify a direction, extent, and/or speed of movement of the user's eyes in real-time, during execution of an xR application.

IMU system 413 may include one or more accelerometers and gyroscopes configured to measure and report a specific force and/or angular rate of the user's head. In some cases, IMU system 412 may be configured to a detect a direction, extent, and/or speed of rotation (e.g., an angular speed) of the user's head in real-time, during execution of an xR application.

In various embodiments, IHS 400 may not include each of the components shown in FIG. 4. Additionally, or alternatively, IHS 400 may include components in addition to those that are shown in FIG. 4. Furthermore, components represented as discrete entities in FIG. 4 may, in some embodiments, be integrated with other components. In various implementations, all or a portion of the functionality provided by the illustrated components may be provided by components integrated as a System-On-Chip (SOC), or the like.

Figure 5:
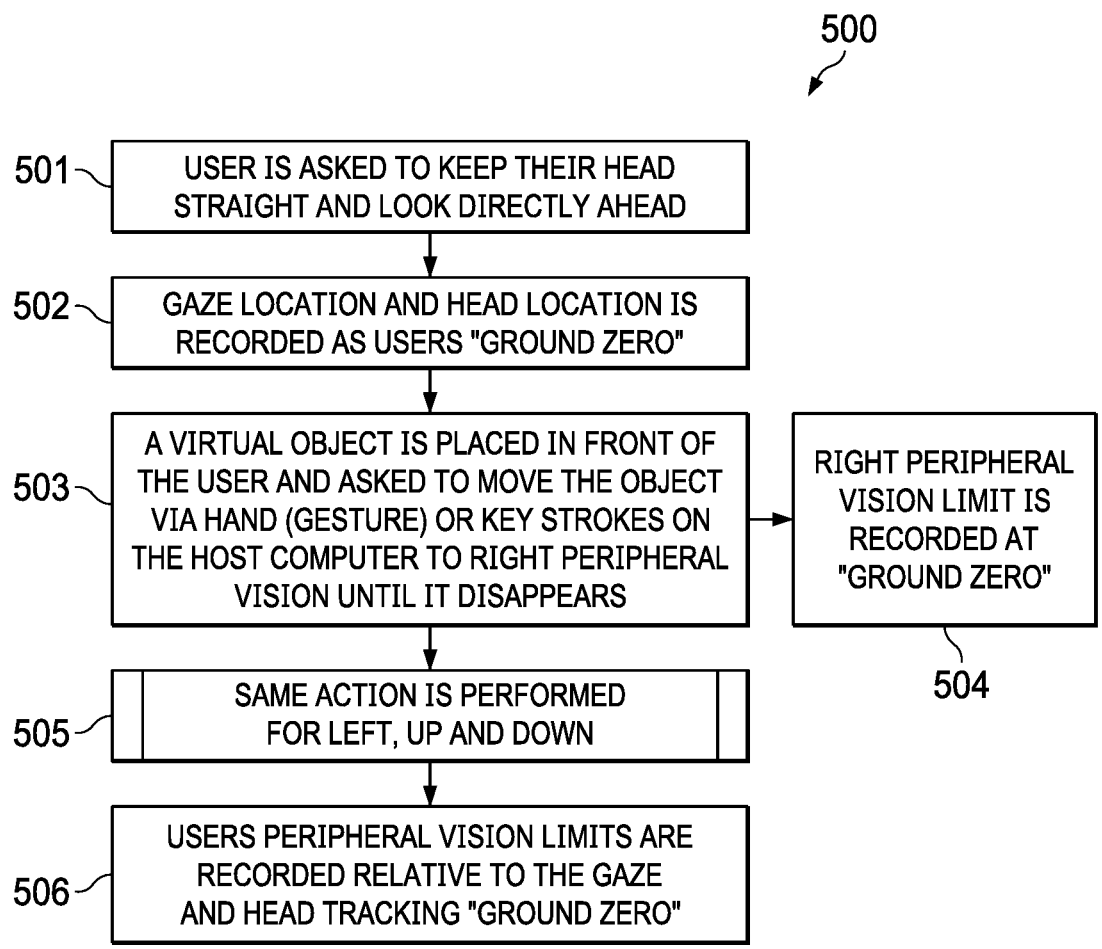
FIG. 5 is a flowchart of an example of a method for calibrating or identifying a user's peripheral field-of-view (FOV), according to some embodiments.

FIG. 5 is a flowchart of an example of method 500 for calibrating or identifying a user's peripheral FOV, according to some embodiments. As shown, method 500 may be performed, at least in part, by processor 401 executing instructions from memory 403 to thereby render xR entities and objects on peripheral displays 406 and 409, under control of user 100.

At block 501, the user may be asked to keep their head straight and to look directly ahead through the entire calibration procedure. For example, headset 101 may render an instructional text on main display area 300 and/or may synthesize speech and output an audio signal containing verbal directions. At block 502, gaze location is gathered via gaze tracking system 412, head location is gathered via IMU 413, and that information is recorded as the user's "ground zero," origin, or default state.

At block 503, an object is rendered in front of the user, and the user is instructed to move the object (e.g., using hand gestures or keystrokes) toward their right side, until the object disappears from the display, while the user maintains their head in its original position. At block 504, the right peripheral vision limit is recorded at the user's ground zero.

That is, block 503 enables the user to displace the initial object in a given direction until the object at least partially disappears from the user's peripheral field-of-view, and block 504 records an extent of the peripheral field-of-view in the given direction based upon the displacement. Block 505 indicates that this procedure may then be performed in the other three directions (i.e., up, down, and left). As a result, at block 506, the user's peripheral vision limits, referred to as peripheral attention area, are recorded relative to the gaze and head's ground zero.

Figure 6:
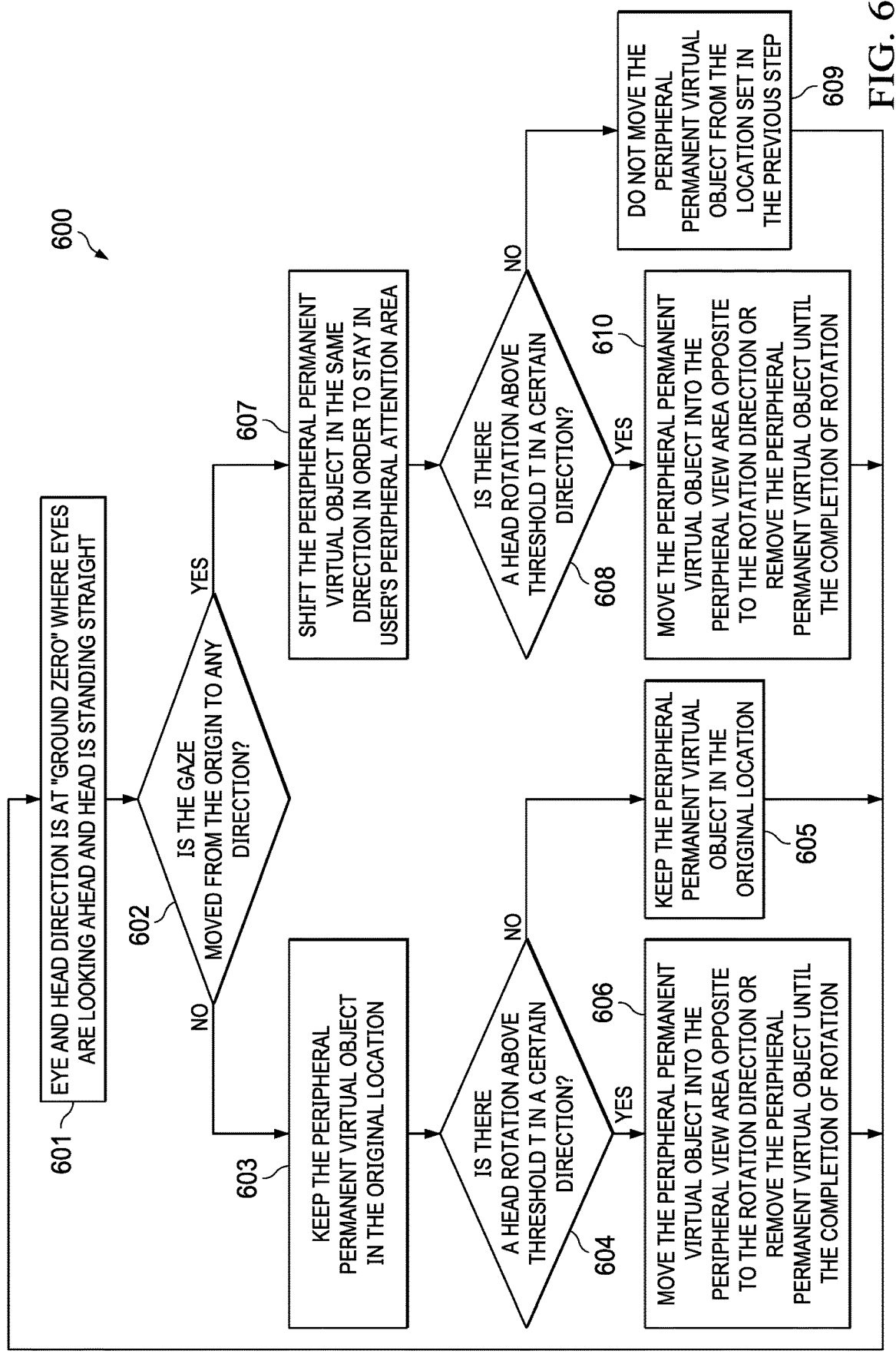
FIG. 6 is a flowchart of an example of a method for handling objects rendered in a user's peripheral FOV during execution of a virtual, augmented, and mixed reality ("xR") application, according to some embodiments.

FIG. 6 is a flowchart of an example of method 600 for handling objects rendered in a user's peripheral FOV during execution of an xR application, according to some embodiments. As shown, method 600 may be performed, at least in part, by processor 401 executing instructions from memory 403 to thereby render xR entities and objects on peripheral displays 406 and 409, under control of user 100.

At block 601, user 100 wearing headset 101 has their eyes and head directed at the ground zero values (e.g., determined using method 500). At block 602, method 600 determines whether the user's gaze has moved from the origin to any direction. For example, a distance between two subsequent gaze focus points, as determined by gaze tracking system 412, may indicate a distance and direction of eye movement. For example, if the distance between two subsequent gaze focus points is above a threshold value, eye movement may be detected.

Assume, for example, that headset 101 is rendering an xR entity or object in a peripheral display, such that the object is restricted to appearing only in the user's peripheral FOV—therefore referred to as "peripheral permanent virtual object." If the user's gaze does not change, block 603 keeps an already-rendered peripheral permanent virtual object in its original location, on the original peripheral display.

At block 604, method 600 determines whether IMU 413 has detected a head rotation above a threshold value T (e.g., a selected angular speed, displacement, and/or direction). If not, block 605 keeps the peripheral permanent virtual object in the original location. If so, block 606 may: (a) move the peripheral permanent virtual object into a peripheral view area opposite the rotation direction; and/or (b) remove the peripheral permanent display object until completion of the head rotation.

Returning to block 602, if the gaze has moved, block 607 then shifts the peripheral permanent virtual object in the same direction in order to stay in the user's peripheral area. At block 608, method 600 determines whether IMU 413 has detected a head rotation above threshold value T If not, block 609 does not move the peripheral permanent virtual object from the location set in the previous step. If so, block 610 may: (a) move the peripheral permanent virtual object into a peripheral view area opposite the rotation direction; and/or (b) remove the peripheral permanent display object until completion of the head rotation.

Figure 7A:
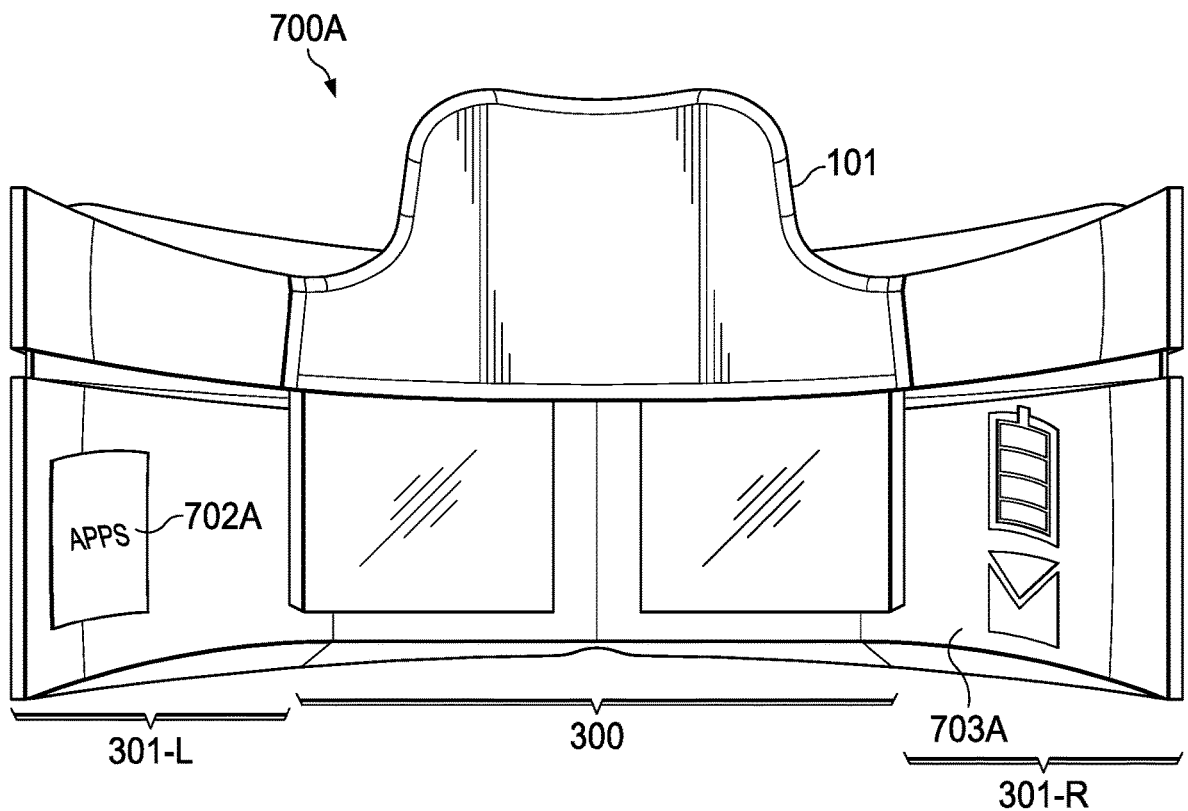
FIGS. 7A and 7B illustrate an example of a method for handling objects rendered in a user's peripheral FOV in response to the user's eye movement.
Figure 7A:
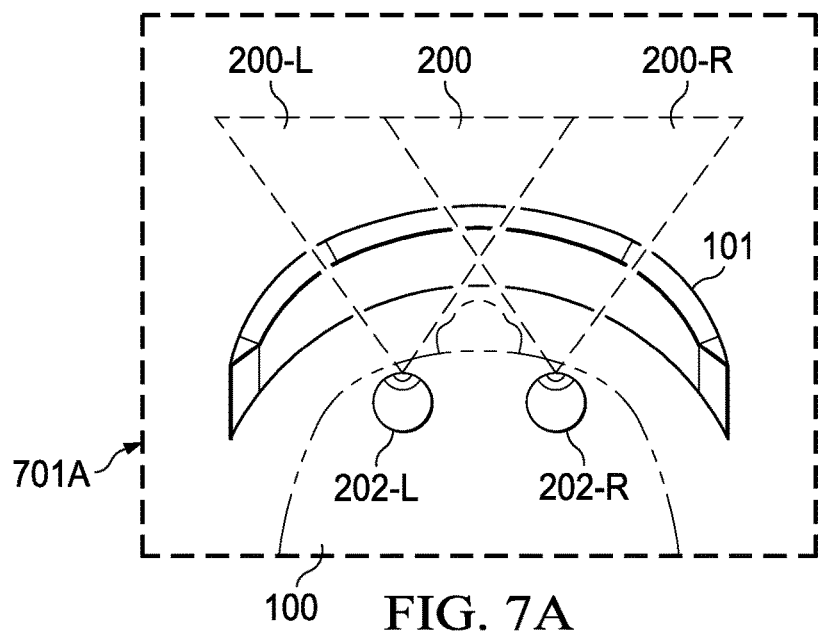
Figure 7B:
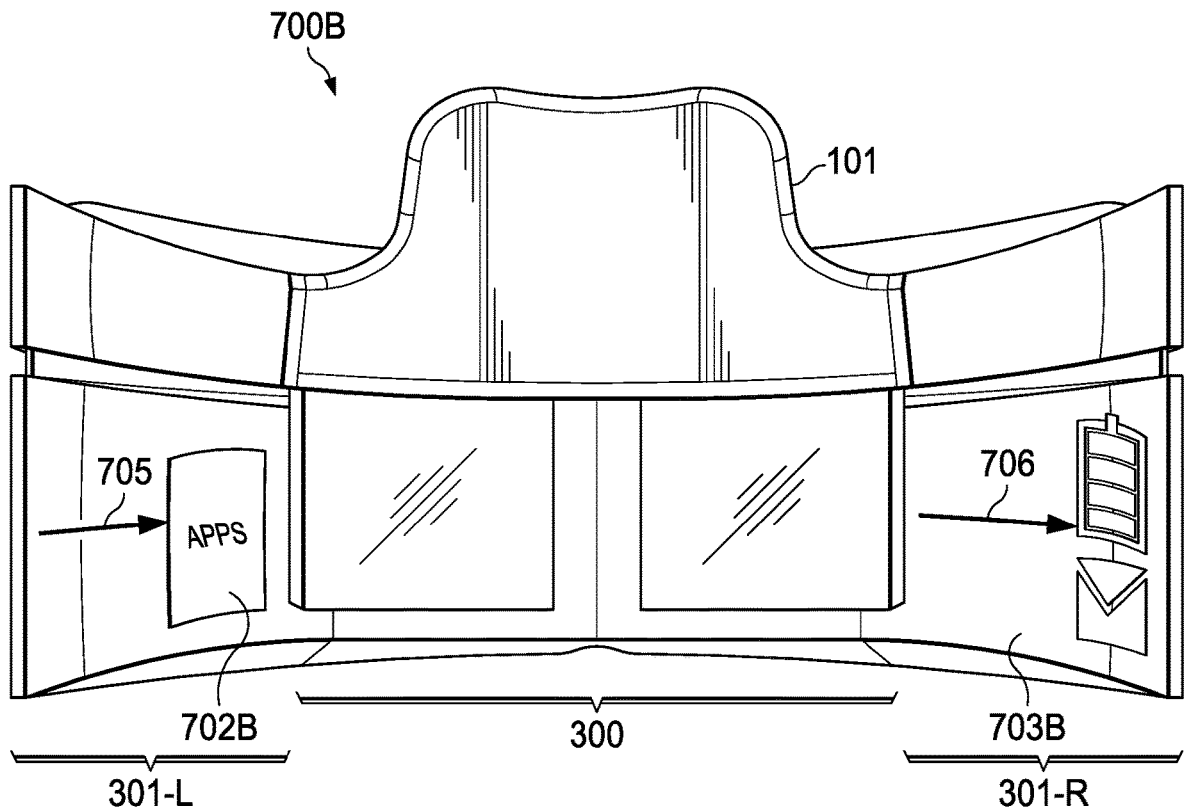
Figure 7B:
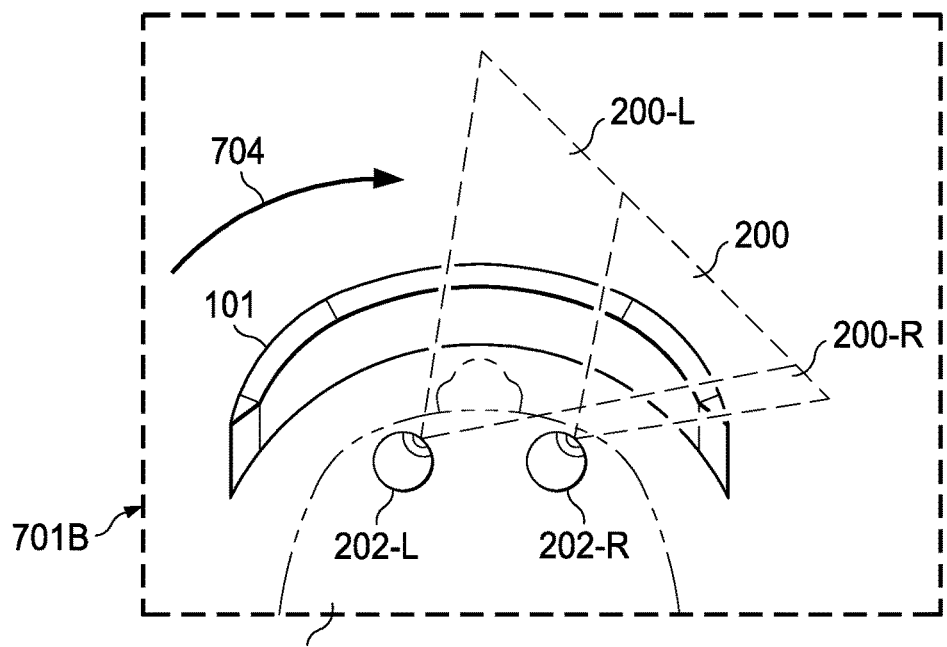

FIGS. 7A and 7B illustrate a method for handling objects rendered in a user's peripheral FOV in response to the user's eye movement, for example, during execution of blocks 602 and 607 (FIG. 6). In FIG. 7A, user 100 is looking directly ahead in position 701A. During execution of an XR application, object 702A is rendered in left peripheral display 301-L, and object 703A is rendered in right peripheral display 301-R.

Then, in FIG. 7B, at a time subsequent to position 701A, the user's gaze is directed to the right side in position 701B, such that an amount 704 of eye movement is detected. In response, object 702B is re-rendered in a new position displaced by amount 705, while still remaining in the user's left peripheral display 301-L, and objects 703-B are re-rendered in a new position displaced by amount 706, remaining in the user's right peripheral display 301-R.

In some cases, displacement 705 be such that object 702B in configuration 701B is re-rendered n pixels to the right of its original position, and displacement 706 may be the same amount, so that object 703B in configuration 701B is re-rendered n pixels to the right of its original position. In other cases, displacement 705 may be larger than displacement 706. Alternatively, displacement 705 may be smaller than displacement 706. Additionally, or alternatively, displacement 705 may be proportional to a length or extent of peripheral vision 200-L (as shown in position 701B), and displacement 706 may be proportional to a length or extent of peripheral vision 200-R (also in 701B).

Figure 8A:
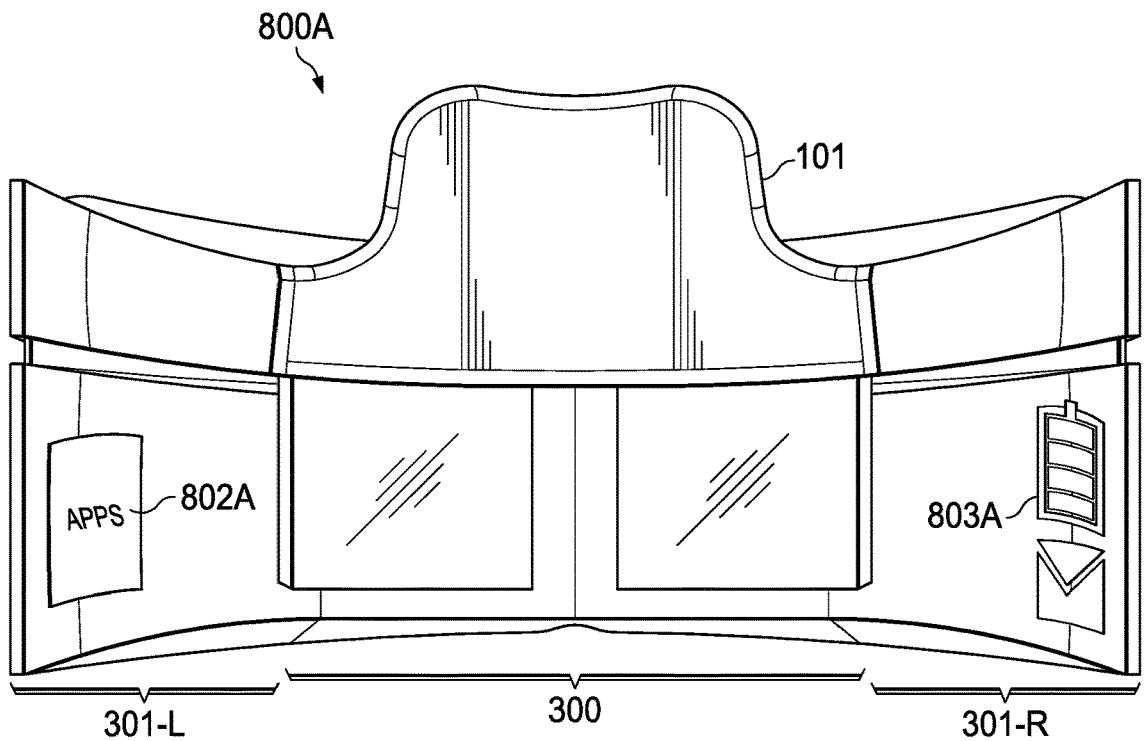
FIGS. 8A-D illustrate examples of methods for handling objects rendered in a user's peripheral FOV in response to the user's head rotation.
Figure 8A:
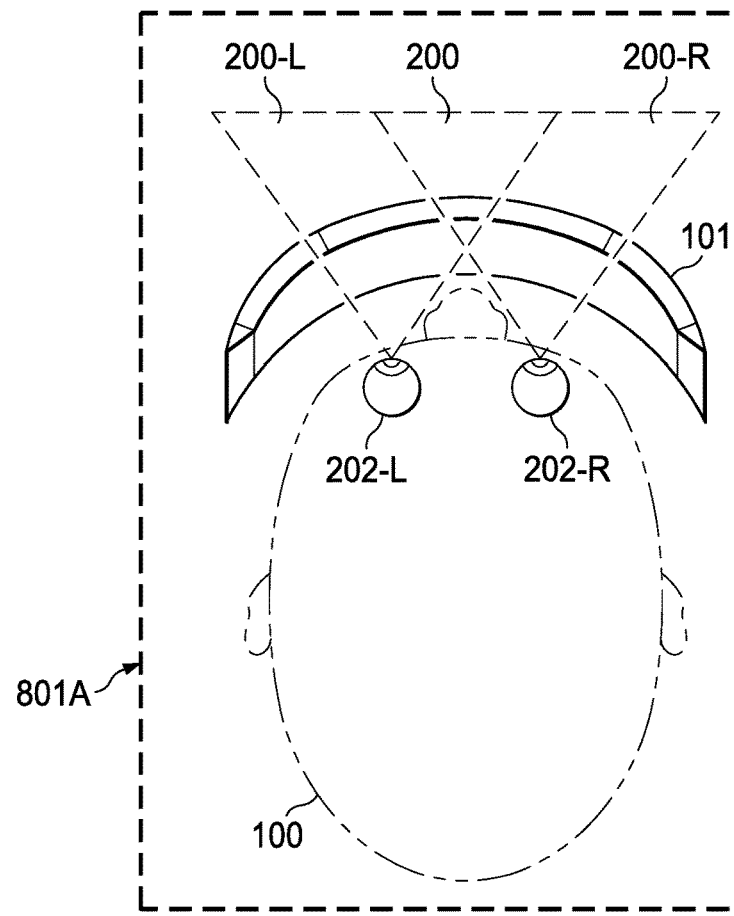

FIGS. 8A-D illustrate examples of methods for handling objects rendered in a user's peripheral FOV in response to the user's head rotation, during execution of blocks 604-606 and/or 608-610 (FIG. 6). In FIG. 8A, user 100 is looking directly ahead, without any head rotation, in position 801A. During execution of an XR application, in state 800A, object 802A is rendered in left peripheral display 301-L and object 803B is rendered in right peripheral display 301-R.

Figure 8B:
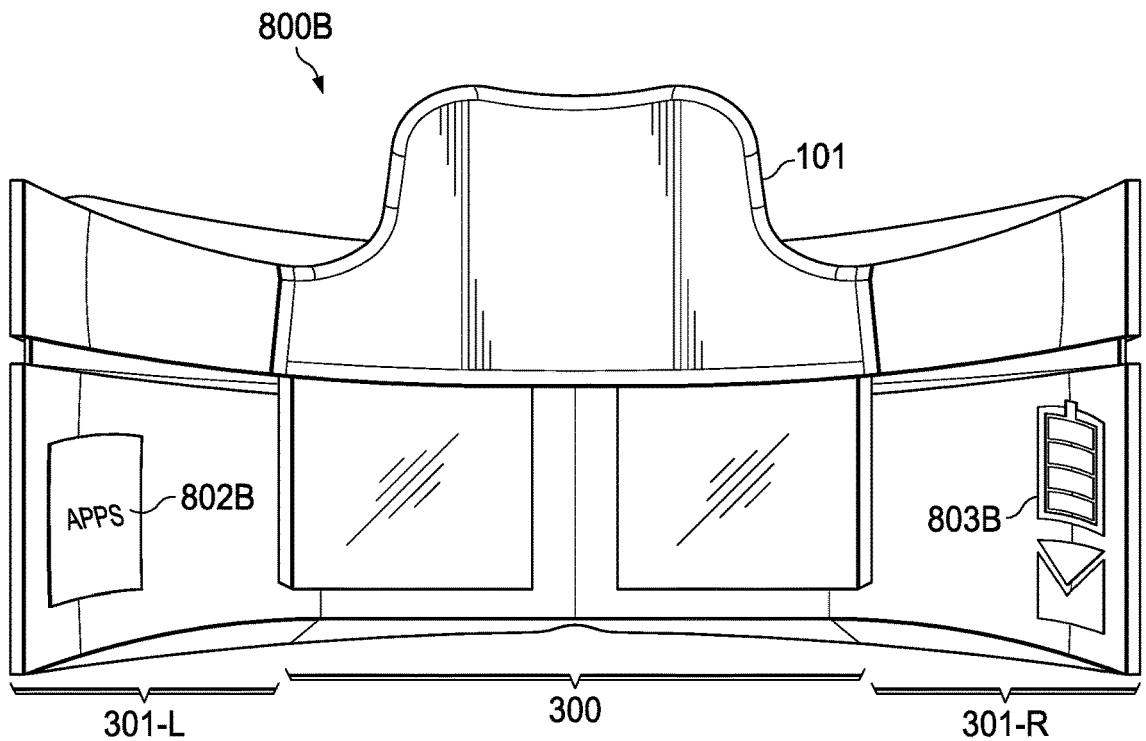
Figure 8B:
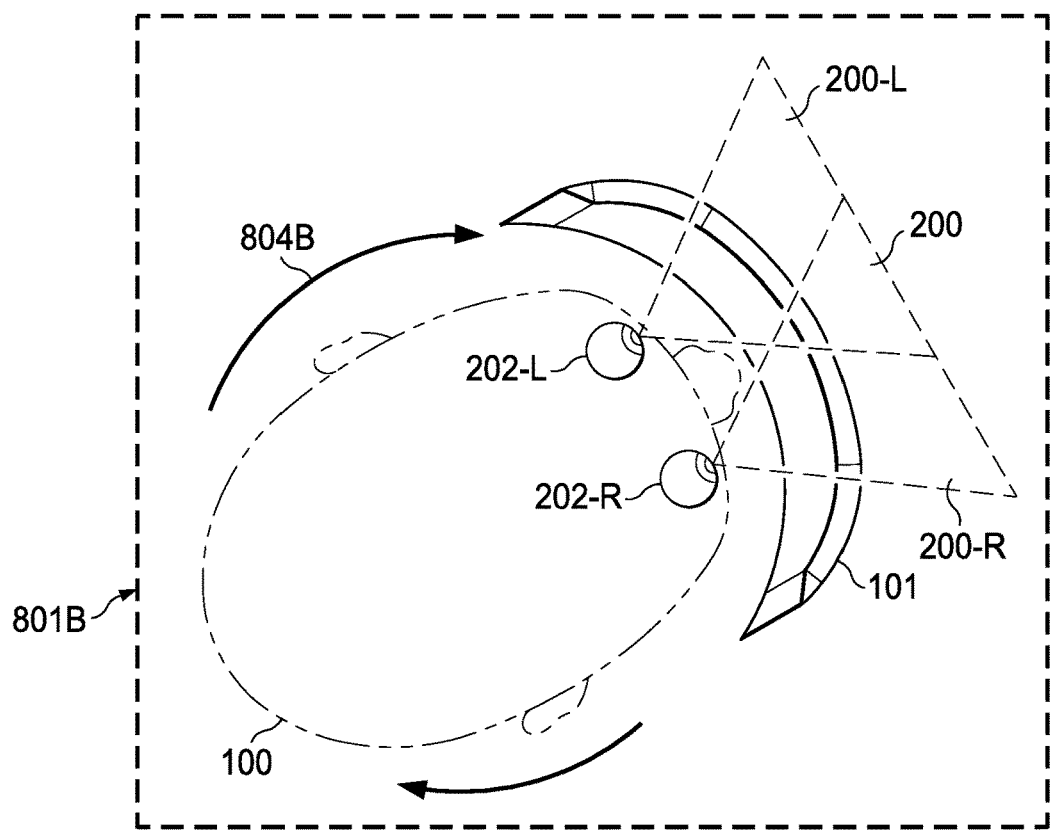

In FIG. 8B, user 100 has rotated their head to the right (clockwise) in position 801B, with an angular speed and/or displacement 804B smaller than a threshold value T; as a result, in state 800B, object 802B is maintained in left peripheral display 301-L, and object 803B is maintained in right peripheral display 301-R.

Figure 8C:
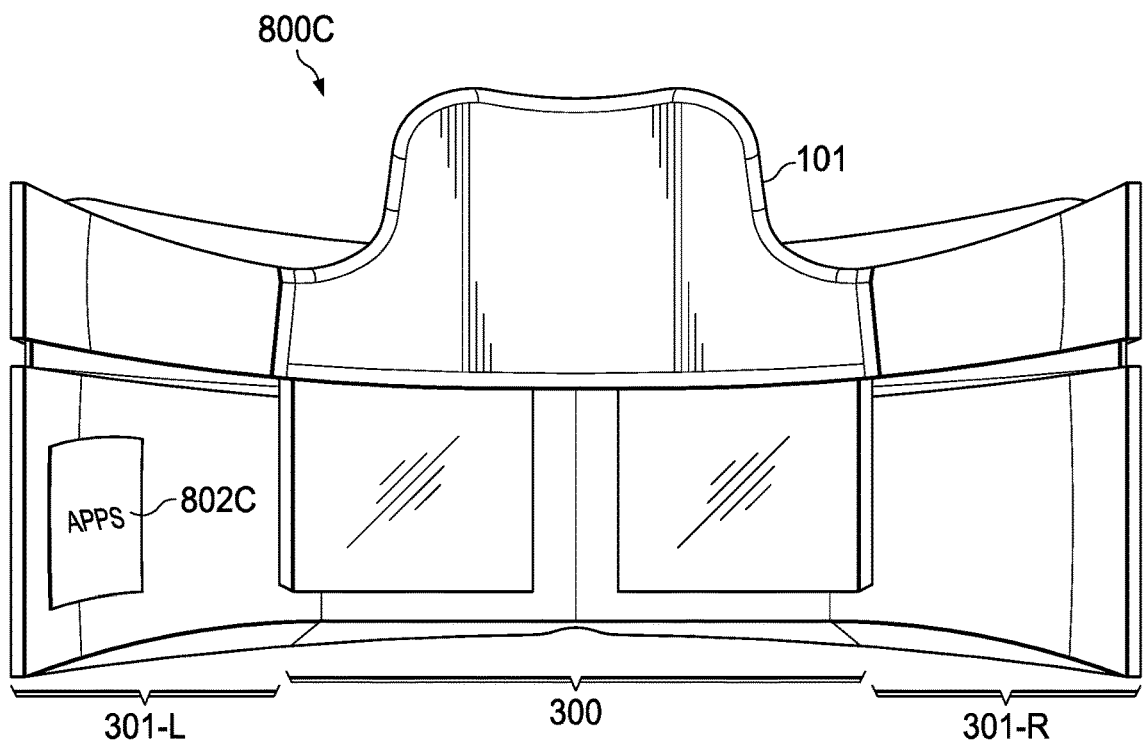
Figure 8C:
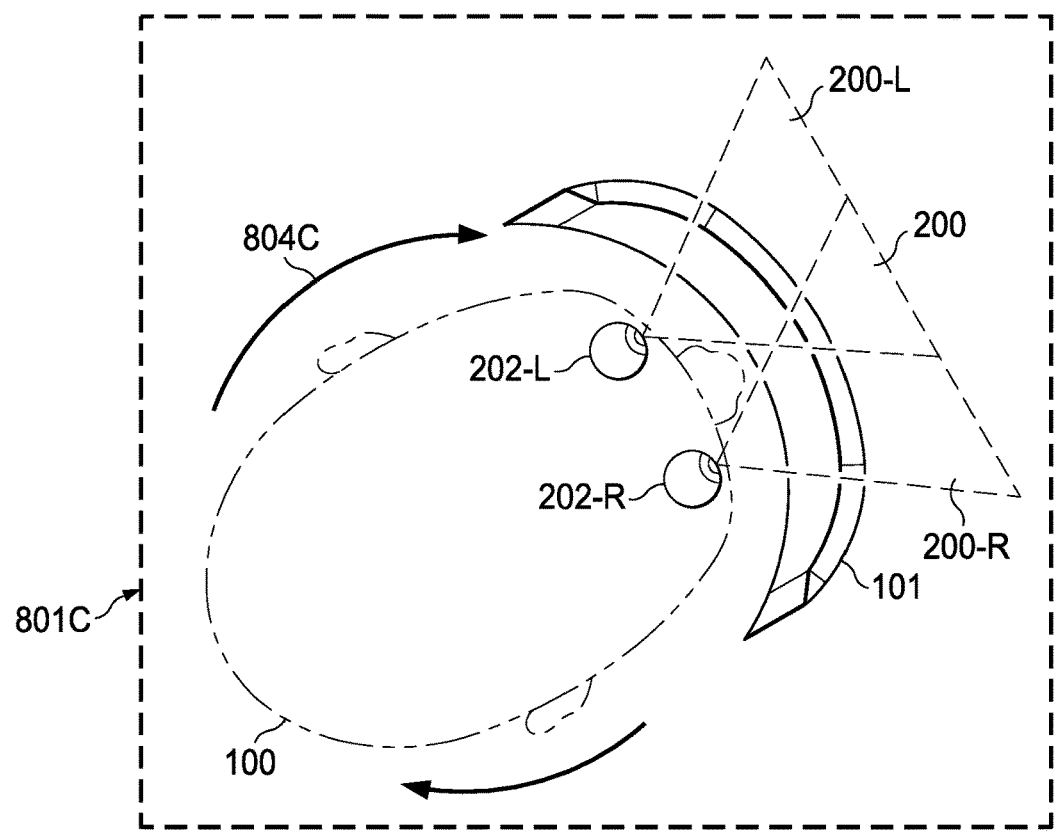

In FIG. 8C, user 100 has rotated their head, again to the right (clockwise), in position 801C, but now with an angular speed and/or displacement 804C greater than the threshold value T. In response, in state 800C, object 802C is maintained in left peripheral display 301-L and object 803B is removed from right peripheral display 301-R.

Figure 8D:
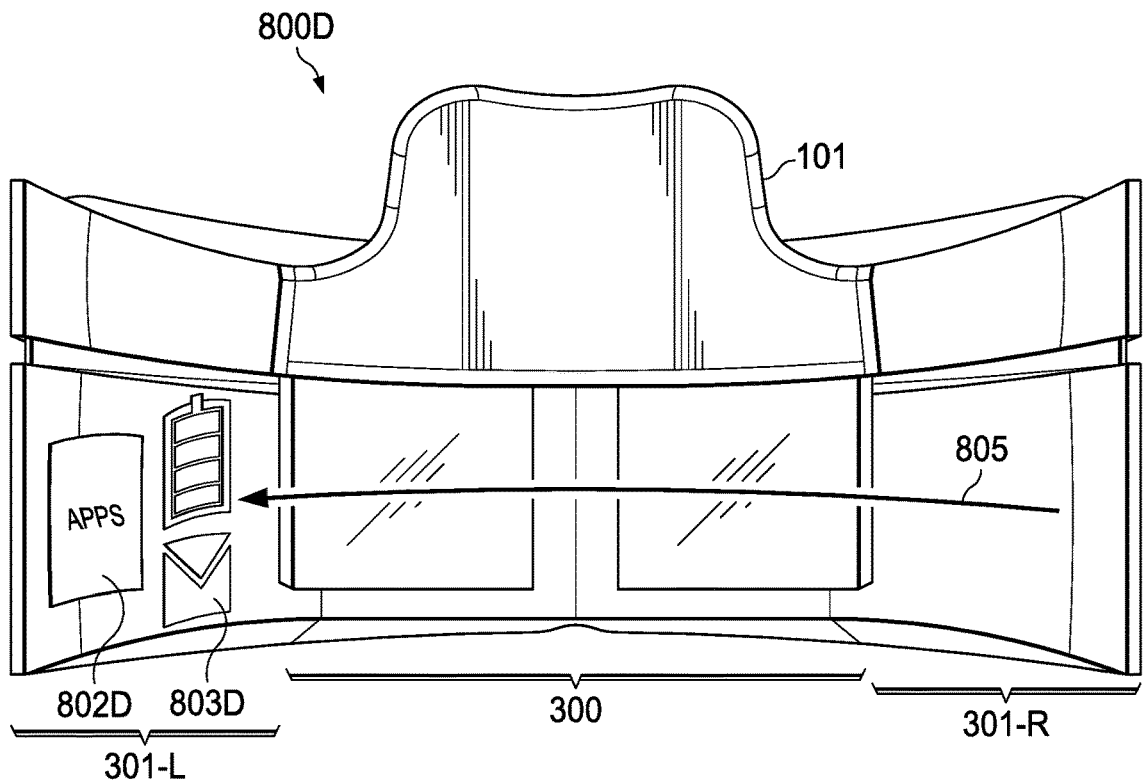
Figure 8D:
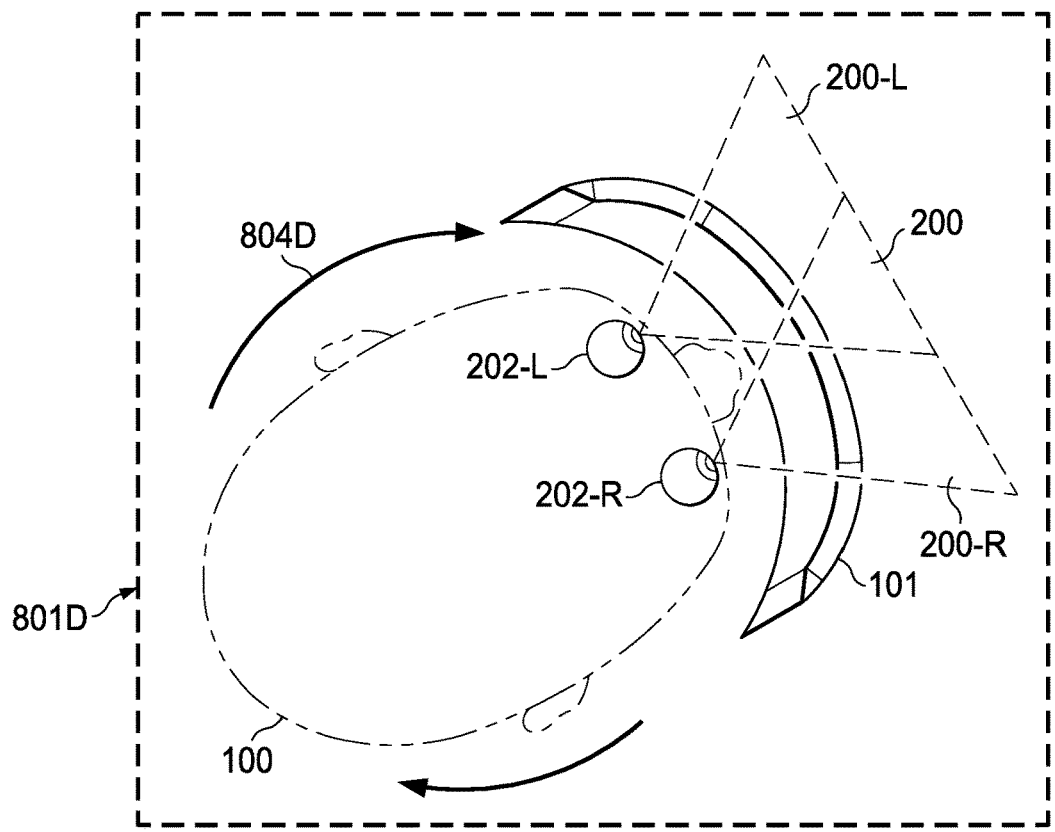

In FIG. 8D, user 100 has rotated their head, yet again to the right (clockwise), in position 801D, and still with an angular speed and/or displacement 804D greater than the threshold value T. In response, in state 800D, object 802D is re-rendered to the left of its original position 802A in left peripheral display 301-L, and object 803D is re-rendered on left peripheral display 301-L, removed by displacement 805 from its original position 803A in right peripheral display 301-R. In some cases, object 803D may be re-rendered along the length of displacement 805 across main display 300 area, with a speed proportional to the speed of the head rotation 804D.

As described herein, in various embodiments, transparent OLED displays may be embedded to the right and left peripheral vision of an xR headset in order to leverage transparent capabilities of OLED for real-world view, and transpose virtual objects to the peripheral vision when needed. Eye and/or head tracking may be integrated in order to handle placement of the peripheral vision objects and alerts.

Transparent OLED displays may be used the side as a continuum of the front/main displays to extend a virtual world into peripheral vision, beyond stereo vision. By using transparent OLEDs, systems and methods described herein also avoid mechanical obstructions. Peripheral AR may be particularly useful in use-cases ranging from gaming to field-worker applications, where cues for direction, objects/ images entering to FOV (stereo vision area), notifications and alerts may be placed in the peripheral vision.

The strategic placement of peripheral permanent virtual objects such as alerts, notifications, menu items (not overlaid on the real world) may be based on head and gaze tracking. Initially, a user's peripheral vision limit may be identified interactively with visual cues and user feedback close-loop, when user's eye is looking straight ahead. After the initial calibration, gaze tracking and head tracking may be used to dynamically move peripheral permanent virtual objects around to improve user experience.

For example, if the user peeks to the right side without moving their head, peripheral objects should move to right in order to stay in the peripheral attention area. The principle may be used for gaze and/or eye movement in other directions. As another example, if a user turns their head around in a certain direction above threshold value and if there are peripheral permanent virtual objects in that direction, those objects may be moved to the opposite direction of the screen in order to not obstruct the user's view or they may be removed from the peripheral vision until the head rotation/movements are completed. In addition, eye/gaze tracking and/or head tracking implementations may be used in combination.

In other embodiments, techniques described herein may also be applied to vertical eye and/or head movements—that is, movement in the vertical or "up-and-down" direction (as opposed to, or in addition to, movement in the horizontal or "side-to-side" direction). In those cases, a user's vertical vision limit(s) may be identified interactively with visual cues and user feedback close-loop, when user's eye is looking straight. After calibration, gaze and/or head tracking may be used to vertically re-render virtual objects.

For example, if the user peeks upward, objects may move upward on the display system in order to remain in the user's vertical attention area. Conversely, if the user peeks downward, objects may move downward on the display system. If the user turns their head upward or downward, and if there are virtual objects in those directions, the objects may be moved to the bottom or top (respectively) of the screen in order to not obstruct the user's view, or they may be removed until the up-and-down head movement is completed, for example, also depending upon whether the movement is above or below a threshold angle or speed value.

As such, systems and methods described herein may enable extension of AR world beyond the stereo vision to peripheral vision, strategic placement of peripheral or vertical permanent virtual objects based on gaze and head tracking, and automatic increase of real/virtual world FOV and total visible area with embedded transparent curved OLED displays. Although in various implementations described herein OLED peripheral displays are used to supplement main displays, in other implementations, the main and peripheral displays may be a single curved display, or the whole left/right eye display may be combined.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A Head-Mounted Device (HMD) wearable by a user, the HMD, comprising:
   a processor;
   a display coupled to the processor, the display having a main portion, a left peripheral portion, and a right peripheral portion; and
   a memory coupled to the processor, the memory having program instructions stored thereon that, upon execution, cause the HMD to:
   display an object on one of: the right peripheral portion or the left peripheral portion;
   detect a speed of the user's head rotation; and
   at least one of: (a) display the object on the one of the right peripheral portion or the left peripheral portion in response to the speed being below a threshold; (b) display the object in the one of the right peripheral portion or the left peripheral portion shifted in a direction opposite the head rotation in response to the speed being above the threshold; or (c) conceal the object during at least a portion of the head rotation in response to the speed being above the threshold.

2. The HMD of claim 1, wherein the main portion comprises a Digital Light Processing (DLP) device, and wherein each of the left and right peripheral portions comprises a curved organic light-emitting diode (OLED) device.

3. The HMD of claim 1, wherein the object is part of a Graphical User Interface (GUI) presented to the user during execution of a virtual, augmented, or mixed reality (xR) application.

4. The HMD of claim 1, wherein in response to detection of eye movement from a forward position to a peripheral position, the program instructions, upon execution, further cause the HMD to display the object at a different position of the one of the right peripheral portion or the left peripheral portion, shifted in the direction of the eye movement.

5. The HMD of claim 1, wherein the program instructions, upon execution, cause the HMD to identify the peripheral field-of-view, for the user, prior the rendering the object.

6. The HMD of claim 5, wherein to identify the peripheral field-of-view, the program instructions, upon execution, further cause the HMD to:
   render an initial object;
   enable the user to displace the initial object in a given direction until the object at least partially disappears from the user's peripheral field-of-view; and
   record an extent of the peripheral field-of-view in the given direction based upon the displacement.

7. A method, comprising:
   displaying a first object on a first peripheral region of a display, wherein the display is part of a user's headset;

displaying a second object on a second peripheral region of the display, wherein the first and second peripheral regions are at opposing sides of a main display portion of the display;

monitoring the user's eye movement and head rotation; and displaying the first and second objects on a single peripheral region of the display in response to the monitoring, wherein: (a) the second peripheral region is to the right of the main portion, the first peripheral region is to the left of the main portion, and displaying the first and second objects on the single peripheral region comprises displaying the first and second objects on the second peripheral region in response to the eye movement being in a right direction; (b) the second peripheral region is to the left of the main portion, the first peripheral region is to the right of the main portion, and displaying the first and second objects on the single peripheral region comprises displaying the first and second objects on the second peripheral region in response to the eye movement being in a left direction; (c) the single peripheral region is on a same side of the display as a direction of the head rotation in response to the monitoring determining that the head rotation has a speed below a threshold; or (d) the single peripheral region is on an opposite side of the display as the direction of the head rotation in response to the monitoring determining that the head rotation has a speed above the threshold.

8. The method of claim 7, further comprising waiting to display the object until completion of a head rotation.

9. A hardware memory device coupled to a headset, wherein the headset comprises a display having a main portion, a left peripheral portion, and a right peripheral portion, the hardware memory device having program instructions stored thereon that, upon execution by a hardware processor coupled to the headset, cause the hardware processor to:

display an object on a selected one of the left or right peripheral portions;

detect a speed of a user's head rotation; and determine, in response to the detection, whether to display the object on the selected peripheral portion, wherein the program instructions, upon execution, further cause the hardware processor to: (a) display the object on the selected peripheral portion, at least in part, in response to the speed being below a threshold; (b) display the object on a different peripheral portion than the selected peripheral portion at least in part, in response to the speed being above the threshold: or (c) omit the object from both the first and second peripheral portions in response to the speed being above the threshold.

* * * * *